United States Patent Office 3,694,358
Patented Sept. 26, 1972

3,694,358
HYDROCARBON OR SILICONE LUBRICATING OIL CONTAINING DIHALOGENOETHYL SUBSTITUTED ORGANOSILICON COMPOUNDS
Edgar D. Brown, Jr., Schenectady, N.Y., assignor to General Electric Company
No Drawing. Original application Sept. 11, 1967, Ser. No. 666,946, now Patent No. 3,555,062, dated Dec. 22, 1970. Divided and this application May 11, 1970, Ser. No. 48,717
Int. Cl. C10m 1/50
U.S. Cl. 252—49.6
4 Claims

ABSTRACT OF THE DISCLOSURE

Mixtures of dihalogenoethyl-substituted organosilicon compositions have been prepared by adding either IBr or ICl to vinyl-substituted silanes and siloxanes. Lubricating compositions of extreme pressure and high temperature characteristics are prepared by adding the mixtures to oils of lubricating viscosity. The lubricating compositions are especially useful for lubricating high temperature alloys.

---

This application is a division of copending application Ser. No. 666,946, filed Sept. 11, 1967, which issued into U.S. Patent 3,555,062.

This invention relates to mixtures of dihalogenoethyl-substituted organosilicon compounds and lubricating compositions containing such mixtures.

As the requirements of modern technology for surfaces which can operate in adverse environments have become more demanding, the metallurgical arts have provided suitable materials, such as the various stainless steels and high temperature metals and alloys. However, the development of lubricating compositions satisfactory to eliminate friction between relatively moving surfaces composed of such high temperature materials has not kept pace with the development of such materials.

While various halogenated compounds are described in the literature for lubricating difficult to lubricate metallic surfaces and while many of these halogen-containing materials do a satisfactory job of lubrication at room temperature, the vast majority of such prior art materials decompose or evaporate at a high rate when exposed to elevated temperatures generated by the environment in which the lubricating surfaces must operate in or generated by lubricating friction. Thus, these prior art materials have had severe shortcomings which have prevented their use.

The present invention is based on my discovery of a new class of halogen-containing materials which are effective as lubricant additives at elevated temperatures and which do not decompose or evaporate under required operating conditions and thus fill a long-felt need in the art. In particular, the present invention is based on my discovery of a composition of matter comprising a mixture of dihalogenoethyl-substituted organosilicon compounds in which approximately 50% of the halogen atoms in the dihalogenoethyl radicals are iodine radicals and in which the remaining halogen radicals are either chlorine or bromine, which each carbon atoms of the dihalogenated ethyl radical containing one carbon-bonded halogen substituent. This invention also deals with various lubricating oils with such dihalogenoethyl-substituted organosilicon compounds as additives.

The dihalogenoethyl-substituted organosilicon compounds comprise a mixture of materials characterized by the presence in the mixture of silicon-bonded dihalogenoethyl radical having the formula:

(1) $XCH_2CHX$— or silicon-bonded dihalogenoethyl radicals having the formula:

(2) $YCH_2CHY$— where each X is a member selected from the class consisting of iodine and bromine, with the number of iodine and bromine atoms being equal and with each Y being a member selected from the class consisting of iodine and chlorine, and with the number of iodine and chlorine atoms being equal. The nature of the groups attached to the remaining valences of silicon is not critical and will be described in more detail hereinafter.

The principal characteristic of the dihalogenoethyl-substituted organosilicon compounds of the present invention is that the compositions are actually a mixture of different materials with different arrangements of the carbon-bonded halogen atoms. Thus, the dihalogenoethyl radical of Formula 1 is actually a mixture of four different possible dihalogenoethyl radicals having the formulae:

(3) $ICH_2CHHI$—
(4) $ICH_2CHBr$—
(5) $BrCH_2CHBr$—
(6) $BrCH_2CHI$

The precise distribution and type of dihalogenoethyl radical which is predominant in the mixture of dihalogenoethyl radicals of Formulas 3 through 6 is a function of the reaction conditions and temperatures. However, the predominant material in the mixture is the alpha-bromo-beta-iodoethyl radical of Formula 4 which comprises from about 80% to 95% of the mixture. However, each of the other groups is present in at least a small amount.

The corresponding mixture of compositions within the scope of Formula 2 are represented by the following formulae:

(7) $ICH_2CHI$—
(8) $ICH_2CHCl$—
(9) $ClCH_2CHCl$—
(10) $ClCH_2CHI$—

Some of each of the dihalogenoethyl radicals of Formula 7 through Formula 10 are present in the mixture of compositions within the scope of Formula 2, with the amount and distribution again being dependent to some extent upon the amount of reactants employed and the reaction conditions. The predominant type of dihalogenoethyl radical present in the compositions is the alpha-chloro-beta-iodoethyl radical of Formula 8, which comprises from about 80% to 95% of the compositions.

The exact nature of the compositions of the present invention can be best understood by reference to the method of preparation of these compounds, which involves the reaction between either IBr or ICl with a vinyl-substituted organosilicon compound characterized by the radical:

(11) $CH_2$=$CHSi$

From this general description of the method of forming the mixture of compositions and from the dihalogenoethyl radicals of Formulas 3 through 10, it is seen that there are four possible modes of addition of the IBr or ICl to the silicon-bonded vinyl group, which accounts for the four different isomeric components of each of the compositional mixtures of the present invention.

The vinyl-containing organosilicon compounds reacted with the IBr or ICl have the formula:

(12) $\quad CH_2=CHSi(R)_3$ in the case of vinyl-substituted silanes, and the formula:

(13) $\quad (CH_2=CH)_a(R)_bSiO_{\frac{4-a-b}{2}}$ in the case of vinyl-substituted organopolysiloxanes, where R in the above formulas represents a monovalent hydrocarbon radical free of aliphatic unsaturation, $a$ has a value of from about 0.05 to 1.0, inclusive; $b$ has a value of from about 1.00 to 2.00, inclusive; and the sum of $a$ plus $b$ is equal to from about 2.00 to 3.00, inclusive.

From the above description, it is seen that the dihalogenoethyl-substituted organosilicon compounds of the present invention are selected from silanes and siloxanes having the following respective formulas:

(14) $\quad (XCH_2CHX)Si(R)_3$
(15) $\quad (YCH_2CHY)Si(R)_3$
(16) $\quad (XCH_2CHX)_a(R)_bSiO_{\frac{4-a-b}{2}}$
(17) $\quad (YCH_2CHY)_a(R)_bSiO_{\frac{4-a-b}{2}}$ where X, Y, R, $a$ and $b$ are as previously defined.

The iodoethyl-substituted organosilicon compounds of Formulas 14 through 17 include a great variety of different materials. These materials are characterized by the presence of the silicon-bonded monovalent hydrocarbon radical free of aliphatic unsaturation which is represented by R and by the presence of the silicon-bonded dihalogenoethyl group. Included within the monovalent hydrocarbon radicals free of aliphatic unsaturation within the scope of R are, for example, alkyl radicals, such as methyl, ethyl, propyl, butyl, isobutyl, octyl, octadecyl, etc. radicals, with the preferred alkyl radicals being lower alkyl radicals containing from 1 to 7 carbon atoms; cycloalkyl radicals, e.g., cyclohexyl, cycloheptyl, etc. radicals; aryl radicals, e.g., phenyl, xylyl, tolyl, naphthyl, etc. radicals, with the preferred aryl radicals being monocyclic aryl radicals; aralkyl radicals, e.g., benzyl, phenylethyl, and other phenyl lower alkyl radicals, etc. The preferred specific radicals represented by R are methyl and phenyl, with the methyl radical being most preferred. In a given organosilicon compound within the scope of any of Formulas 14 through 17, all of the R groups can be the same or a mixture of different R groups can be present.

The dihalogenoethyl-substituted organosilicon compounds within the scope of Formulas 16 or 17 comprise one or more siloxane units having the formula:

(18) $\quad (XCH_2CHX)(R)_cSiO_{\frac{3-c}{2}}$ or the formula:

(19) $\quad (YCH_2CHY)(R)_cSiO_{\frac{3-c}{2}}$ alone or in combination with siloxane units having the formula:

(21) $\quad (R)_dSiO_{\frac{4-d}{2}}$ where R is as previously defined, $c$ is a whole number equal to from 1 to 2, inclusive, and $d$ is a whole number equal to from 0 to 3, inclusive. The proportions of the siloxane units of Formula 18 or Formula 19 and the siloxane units of Formula 20 in the organopolysiloxane are selected so as to provide a total of from 0.05 to 1.0 silicon-bonded dihalogenoethyl radicals per silicon atom, from 1.00 to 2.00 R groups per silicon atom, and with a total of from 2.00 to 3.00 dihalogenoethyl groups plus R groups per silicon atom, all of which are selected to place the dihalogenoethyl-substituted organopolysiloxane within the scope of either Formula 16 or Formula 17.

Included within the scope of the dihalogenoethyl-substituted organosilanes of Formula 14 or Formula 15 can be mentioned those silanes in which the three R groups are methyl, the three R groups are phenyl, one of the R groups is methyl and two are phenyl, or all of the R groups are ethyl, etc.

The dihalogenoethyl-substituted organopolysiloxanes of Formula 16 or Formula 17 include linear siloxanes, branched chain siloxanes and cyclopolysiloxanes. These materials are generally liquids but, in some special cases, the products are waxy or crystalline solids which melt at moderately elevated temperatures. Typical of some of the simpler mixtures of compositions within the scope of the dihalogenoethylsiloxanes of Formula 16 or Formula 17 are the dihalogenoethylpentamethyldisiloxanes, the 1,3-bis(dihalogenoethyl)tetramethyldisiloxanes, the dihalogenoethylheptamethylcyclotetrasiloxanes, the methyldihalogenoethylsiloxane cyclic tetramers, low viscosity trimethylsilyl chain-stopped poly(methyldihalogenoethyl)-siloxanes, etc.

The preparation of the dihalogenoethyl-substituted silanes and siloxanes of Formulas 14 through 17 is relatively straightforward and simply comprises the reaction between IBr and ICl and the vinyl-containing organosilicon compounds of Formulas 12 or 13. The IBr or ICl adds across the double bond of the silicon-bonded vinyl group without catalyst and with an exotherm. As previously mentioned, the principal product of the addition reaction with either IBr or ICl is the product with iodine on the beta carbon atom and the other halogen on the carbon atom which is alpha to silicon. However, each of the other three possible addition products is present in some amount. Generally, the major component of the addition reaction is present in about 85 percent, based on the total addition product.

The reaction between the vinyl-containing organosilicon compound of Formula 12 or Formula 13 and the liquid IBr or ICl theoretically requires one mole of the iodine monohalide per mole of silicon-bonded vinyl groups. It is desirable to insure that all silicon-bonded vinyl groups are reacted and, therefore, an excess of the iodine monohalide is generally employed in the reaction mixture. A suitable excess of the iodine monohalide is generally from about 10% to 50% excess, with perfectly satisfactory results being obtained when the amount of iodine monohalide is employed in the range of about 25% excess.

The reaction between the vinyl-containing organosilicon compound of Formula 12 or Formula 13 and the IBr or ICl is conveniently effected in the presence of a solvent. Suitable solvents are those which are inert to the reactants under the conditions of the reaction and preferably solvents of high volatility. Suitable solvents include chloroform, carbon tetrachloride, methylene dichloride, hexane, etc. The solvent is usually present in an amount equal to 50 to 500 parts by weight per 100 parts of the other reactants. The most convenient method for effecting reaction is to dissolve the vinyl-containing organosilicon compound in the solvent in a reaction vessel and to slowly add the iodine monohalide. The progress of the reaction can be followed by infrared analysis, with the disappearance of the band corresponding to the vinyl radical indicating completion of the reaction. Generally, the reaction is allowed to proceed under autogenous temperature and atmospheric pressure with the time of the reaction being from about 1 to 2 hours. After completion of the addition of the iodine monohalide to the reaction mixture, the reaction mixture is stripped to remove solvent and any unreacted iodine monohalide, which results in a mixture of various dihalogenethyl-substituted organosilicon compounds within the scope of Formulas 14 through 17. As previously mentioned, the addition of the iodohalide to the silicon-bonded vinyl groups results in a principal portion of the adduct typified by Formula 4 or Formula 8. However, other isomers are also present in the reaction mixture but the presence of these other isomers has no affect on the utility of the reaction mixture and no benefit is obtained from attempting to isolate the various isomers.

The mixtures of dihalogenoethyl-substituted organosilicon compounds within the scope of Formulas 14 through 17 are useful as additives for other lubricating materials and even as additives for converting very poor lubricating materials into useful lubricating materials.

In utilizing the dihalogenoethyl-substituted organosilicon compounds of the present invention as additives for other lubricating materials, the resulting materials are used as other lubricants to reduce the friction between two solid surfaces which move relative to each other. The lubricating oils to which the dihalogenoethylsilanes and siloxanes are added include any type of lubricating oils ranging from gasoline and kerosene to other common lubricating oil materials. The preferred class of lubricating oils which are the base lubricating fluids in one embodiment of my invention are the hydrocarbon oils and the silicone oils. Suitable hydrocarbons are those occurring naturally in petroleum and particularly are those useful for lubrication of machinery, e.g., neutral oils having a viscosity between about 50 SUS at 100° F. and 2,000 SUS at 100° F. or bright stocks having a viscosity between 90 and 300 SUS at 210° F., but any petroleum product which is required to have oiliness in certain uses can be improved in this property by adding the dihalogenoethyl-substituted silanes and siloxanes of the present invention. The preferred petroleum hydrocarbons are those boiling above 300° F. and especially preferred are those boiling above 500° F. at atmospheric pressure.

For many of the usual applications of this invention, lubricating oils, cutting oils, metal working oils, hydraulic fluids, pneumatic equipment oils, spindle oils, gear oils, and the like can be used as the base lubricating fluid. It is contemplated in one of the preferred embodiments of my invention that the lubricating oils include straight mineral lubricating oils or distillates derived from paraffinic, naphthenic, asphaltic or mixed base crudes or, if desired, various blended oils can be employed as well.

The silicone oils which can be used as the base fluid in the compositions of the present invention include those silicones described in Pat. 2,469,888, Patnode, which comprise conventional silicone materials which are commercially available from a number of sources. These organopolysiloxanes are characterized by the general formula:

(20) 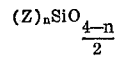

where Z is a member selected from the class consisting of monovalent hydrocarbon radicals and halogenated monovalent hydrocarbon radicals and $n$ has a value of from about 2.001 to 2.2. The radicals represented by Z in Formula 21 are the conventional radicals usually associated with silicone materials and include alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; cycloaliphatic radicals, e.g., cyclohexyl, cycloheptyl, etc. radicals; unsaturated aliphatic radicals, e.g., vinyl, allyl, cyclohexenyl, etc. radicals; halogenated monovalent hydrocarbon radicals, e.g., chloromethyl, chloroethyl, dibromophenyl, omega,omega, omega-trifluoropropyl, etc. radicals. In the preferred embodiment of my invention, the radicals represented by Z are monovalent hydrocarbon radicals free of aliphatic unsaturation, and in the preferred specific embodiment of my invention, the radicals are selected from the class consisting of methyl and phenyl, with the preferred radical of this pair being the methyl radical.

In preparing the lubricating compositions of the present invention which contain the mixture of dihalogenoethyl-substituted organosilicon compounds of Formulas 14 through 17 and a lubricating oil, the dihalogenoethyl-substituted organosilicon compound is merely dissolved in or dispersed in the lubricating oil to form the desired composition. In general, the amount of the dihalogenoethyl-substituted organosilicon compound which can be added to the lubricating oil varies within wide limits. However, one of the beneficial features of the present invention is that excellent lubricating characteristics are obtained when only small amounts of the dihalogenoethyl-substituted organosilicon compound is added. Suitable amounts effective to improve lubricating characteristics include, for example, from about 0.01 to 10 parts by weight of the dihalogenoethyl-substituted organosilicon compound per 100 parts of the lubricating base fluid. In practice, it is found that the solubility of the dihalogenoethyl-substituted organosilicon compounds of the present invention differ with different base oils so that a person skilled in the art would select an amount of additive no greater than the solubility of such additive in the base oil. Thus, the dihalogenoethyl-substituted organopolysiloxanes of Formulas 16 and 17 are highly soluble in silicone base oils but soluble only to an extent of about 4% by weight in mineral oil. These factors are taken into account in designing the particular lubricating composition to be employed for a given lubricating application.

In addition to dihalogenoethyl-substituted organosilicon compounds dissolved in base lubricating fluids, the lubricating compositions of the present invention also contemplate the addition of other additives, such as wetting agents, fillers, thickeners, and dyes, to the base lubricating fluid. In some instances, it is advantageous to add minor amounts, from about 5 to 20 percent by weight of mutual solvent, for both the dihalogenoethyl-substituted organosilicon compound and the base lubricating fluid where the solubility of the dihalogenoethyl-substituted organo-silicon compound in the base lubricating fluid is limited. The various fillers added to the lubricating compositions are used to obtain grease-like consistency and are generally non-abrasive fillers, such as silica gel, carbon black, diatomaceous earth, graphite, etc.

The dihalogenoethyl-substituted organosilicon compounds of Formulas 14 through 17 and the compositions comprising these materials and a base lubricating fluid can be used to lubricate a plurality of pairs of surfaces which move with respect to each other. These compositions are particularly useful in the lubrication of surfaces which heretofore have been almost impossible to lubricate by conventional methods. Of particular utility is the lubrication of two solid surfaces moving relative to each other when one of the surfaces is a metal which is at least 50% titanium. The other surface can be a metal used for fabricating structural shapes, e.g., iron, molybdenum, silver, copper, beryllium, tungsten, magnesium, titanium, zirconium, chromium, nickel, cobalt, aluminum, tin, etc., and various metal compositions, for example, high and low temperature alloys of which typical examples are steels, brasses, the various alloys of magnesium, cobalt, nickel, zinc, chromium, zirconium, beryllium, aluminum, iron, etc.

In addition to lubricating surfaces which include titanium, the compositions of the present invention are also useful as extreme pressure lubricating compositions for pairs of metal surfaces moving relative to each other when neither of the surfaces contains titanium. Thus, these compositions are useful for lubricating any combination of two of the surfaces previously described. The present invention is especially useful for the lubrication of heat-resistant alloys, such as those commercially available under the names of Rene 41, Inconel 718, Monel K, Hastaloy C, and Udimet, all of which are nickel-based alloys of published composition.

The amount of the dihalogenoethyl-substituted organosilicon compound in combination with the hydrocarbon or silicone base oils can vary within wide limits, which are within the scope of those having ordinary skill in the lubricating art. The amount of lubricating composition is merely selected to insure that there is a lubricating supply of the lubricant composition between the surfaces which are to be lubricated.

The following examples are illustrative of the preparation of mixtures of dihalogenoethyl-substituted organosilicon compounds within the scope of the present invention, of the preparation of lubricating compositions by the addition of such dihalogenoethyl-substituted organosilicon compounds to lubricating oils, and of the method of lubricating surfaces with such compositions. These examples are illustrative only and are not intended for purposes of limitation. All parts are by weight.

EXAMPLE 1

To a reaction vessel was added 344 parts of 1,3,5,7-tetramethyl - 1,3,5,7 - tetravinylcyclotetrasiloxane in 500 parts of carbon tetrachloride and 828 parts of IBr was slowly added over a 2 hour period, with the rate of addition being controlled to keep the autogenous temperature from rising above about 45° C. Upon completion of the addition of the IBr, the reaction mixture was examined by infrared analysis and completion of the analysis was evidenced by the disappearance of the 6.25 and 7.1 micron peaks corresponding to the silicon-bonded vinyl groups in the cyclotetrasiloxanes. After determining that the reaction had been completed, the solvent and unreacted IBr was stripped at a temperature of 90° C. at 20 mm. Chemical analysis of the reaction product showed the presence of about 68% total halogen and 42% iodine as compared with the theoretical values of 70.6% total halogen and 43.3% iodine. Solubility of the product in white mineral oil was about 8% by weight.

The reaction product comprised a mixture of dihalogenoethyl-substituted cyclotetrasiloxane having the formula:

| Component | Percent composition of components in siloxane |
|---|---|
| $[(ICH_2CHI)(CH_3)SiO]$ | 4 |
| $[(BrCH_2CHBr)(CH_3)SiO]$ | 4 |
| $[(ICH_2CHBr)(CH_3)SiO]$ | 85 |
| $[(BrCH_2CHI)(CH_3)SiO]$ | 7 |

The principal component of the reaction mixture was the alpha-bromo-beta-iodoethyl-substituted cyclotetrasiloxane as indicated by the above table which shows the approximate percentages of each component of the reaction mixture. The reaction mixture was a reddish-brown liquid of relatively low viscosity.

EXAMPLE 2

A lubricating composition was prepared from the mixture of dihalogenoethyl-substituted organosilicon compounds of Example 1 by dissolving varying amounts of the mixture of dihalogenoethyl-substituted organosilicon compounds to white mineral oil. In the table below is listed the wear scar of a control and of lubricating compositions of the present application in a conventional Four-Ball Wear test, where a steel ball was rotated at a speed of 600 r.p.m. in contact with three stationary metal balls immersed in the lubricating composition, with the test running for one hour with a load of 30 kg. on the rotating ball. The test was run employing both 52-100 tool steel and 302 stainless steel. In the table is listed the amount of the product of Example 1 (siloxane additive) added to 100 parts of mineral oil, the wear scar in mm. for tool steel and for stainless steel.

TABLE

| Mineral oil, parts | Siloxane additive, parts | Wear scar, mm. | |
|---|---|---|---|
| | | 52-100 steel | 302 stainless |
| 100 | 0.00 | 0.46 | N.G. |
| 100 | 0.25 | 0.52 | 0.51 |
| 100 | 0.50 | 0.49 | 0.52 |

As the table shows, the lubricating characteristics of the compositions of the present invention are comparable to the lubricating characteristics of mineral oil alone in terms of 52-100 steel lubrication. However, mineral oil alone fails completely to lubricate 302 stainless and it is literally impossible to run the Four-Ball Wear test. On the other hand, with the additive compositions of the present invention in mineral oil at a level of either 0.25 part or 0.50 part per 100 parts mineral oil, the lubricating characteristics are comparable to lubricating characteristics on simple to lubricate tool steel.

As a further illustration of the special utility of the lubricating compositions of the present invention, a control was prepared by forming a mixture of 50% white mineral oil, 45% of a commercial mixture consisting of 26.5% diphenyl and 73.5% diphenyloxide and 5% by weight iodine. While this composition was completely effective in lubricating both the 52-100 tool steel and the 302 stainless steel at room temperature, the material was highly volatile at elevated temperatures and, therefore, unsatisfactory for high temperature lubricating applications. Thus, when this material was maintained at a temperature of 60° C. for 10 hours, all of the material evaporated. On the other hand, there is no measurable loss of the lubricating compositions of this example after several weeks at 60° C.

EXAMPLE 3

Following the procedure of Example 1, 650 parts of ICl was slowly added to 344 parts of the tetramer of methylvinylsiloxane dissolved in 500 parts methylene dichloride ($CH_2Cl_2$) over a 2 hour period during which time the temperature of the reaction mixture rose to about 45° C. The course of the reaction was followed by infrared analysis and at the completion of the addition of the ICl, the reaction was substantially complete as indicated by the disappearance of the peaks at 6.25 and 7.1 microns corresponding to silicon-bonded vinyl groups. The reaction mixture was then cleaned up as in Example 1 to yield a pale yellow liquid which was soluble in mineral oil to an extent of about 10%. Chemical analysis of this reaction mixture showed the presence of about 64% total halogen and 50% iodine, as compared with the theoretical values of 65.4% total halogen and 51.1% iodine. This product comprised a mixture of dihalogenoethyl-substituted cyclotetrasiloxanes, the components and percentage composition of which are shown in the following table.

| Component: | Percent composition |
|---|---|
| $[(ICH_2CHI)(CH_3)SiO]_4$ | 6 |
| $[(ClCH_2CHCl)(CH_3)SiO]_4$ | 6 |
| $[(ICH_2CHCl)(CH_3)SiO]_4$ | 83 |
| $[(ClCH_2CHI)(CH_3)SiO]_4$ | 5 |

When 0.25 part of the above mixture was added to 100 parts of mineral oil and subjected to the Four-Ball Wear test at a speed of 600 r.p.m. and under a 30 kg. load, the wear scar was 0.50 mm. on 52-100 tool steel and 0.52 mm. on 302 stainless steel, indicating the utility of this composition in lubricating difficult to lubricate surfaces.

EXAMPLE 4

The general procedure of Example 1 was prepared by slowly adding over a 3 hour period 250 parts of IBr to 100 parts of vinyltrimethylsilane and 500 parts carbon tetrachloride. During the addition, the reaction mixture rises to a temperature of about 60° C. At the completion of the reaction, the excess IBr and solvent are removed by stripping. The resulting product is a mixture of four dihalogenoethyltrimethylsilanes of the formula and composition listed below.

| Component: | Percent composition |
|---|---|
| $(ICH_2CHI)Si(CH_3)_3$ | 3 |
| $(BrCH_2CHBr)Si(CH_3)_3$ | 3 |
| $(ICH_2CHBr)Si(CH_3)_3$ | 92 |
| $(BrCH_2CHI)Si(CH_3)_3$ | 2 |

This material is effective as an extreme pressure lubricant additive when added to a 100 centistoke at 25° C. methyl silicone fluid with respect to lubrication of stainless steel on stainless steel.

EXAMPLE 5

To a reaction vessel is added 482 parts of a dimethylvinyl chain-stopped dimethylpolysiloxane fluid containing an average of 6 silicon atoms per molecule. To this reaction mixture is slowly added 325 parts of ICl in 400 parts carbon tetrachloride over a 2 hour period to produce a mixture of compositions in which the terminal silicon atoms contain two methyl units and one dihalogenoethyl group. The distribution of the halogen atoms is similar to that of Example 3, with the principal product being the addition product containing a chlorine atom on the carbon alpha to silicon and an iodine atom on the carbon beta to silicon. This composition is useful as an additive to white mineral oil to improve the extreme pressure lubricating characteristics of mineral oil.

While the foregoing examples have illustrated a number of the embodiments of my invention, it should be understood that my invention is directed broadly to organosilanes and organosiloxanes containing silicon-bonded dihalogenoethyl radicals of the general type and distribution previously mentioned. These compositions are especially useful when added in small amounts to lubricating oils, which small amounts are effective to impart extreme pressure lubricating characteristics to such lubricating oils.

What I claim as new and desire to secure by Letters Patent of the United States is:

1. A lubricating oil composition comprising (a) 100 parts of a lubricating oil selected from the class consisting of hydrocarbon oils and silicone oils of lubricating viscosity, and (b) from 0.01 to 10 parts of a mixture of dihalogenoethyl-substituted organosilicon compounds selected from the class consisting of mixtures having the formula, $$XCH_2CHXSi(R)_3$$
$$YCH_2CHYSi(R)_3$$
$$(XCH_2CHX)_a(R)_bSiO_{\frac{4-a-b}{2}}$$

and $$(YCH_2CHY)_a(R)_bSiO_{\frac{4-a-b}{2}}$$

where each X is a member selected from the class consisting of iodine and bromine, with the number of iodine and bromine atoms being equal, each Y is a member selected from the class consisting of iodine and chlorine, with the number of iodine and chlorine atoms being substantially equal, R is selected from the class consisting of alkyl radicals, cycloalkyl radicals, monocyclic aryl radicals and aralkyl radicals, $a$ has a value of from about 0.05 to 1.0, inclusive; $b$ has a value of from about 1.00 to 2.00, inclusive; and the sum of a plus $b$ is equal to from about 2.00 to 3.00, inclusive, each $XCH_2CHX$— radical is a mixture of $ICH_2CHI$—, $BrCH_2CHBr$—, $$ICH_2CHBr—$$

and $BrCH_2CHI$— radicals, with the major portion of said $XCH_2CHX$— radicals being $ICH_2CHBr$— radicals; and each $YCH_2CHY$— radical is a mixture of $ICH_2CHI$— radicals, $ClCH_2CHCl$— radicals, $ICH_2CHCl$—, and $ClCH_2CHI$— radicals, with the major portion of said $YCH_2CHY$— radicals being $ICH_2CHCl$— radicals.

2. The composition of claim 1 in which said lubricating oil is a hydrocarbon oil.

3. The composition of claim 1 wherein the components of the dihalogenoethyl-substituted organosilicon compound mixture have the formula:

$$[(ICH_2CHI)(CH_3)SiO]_4$$
$$[(BrCH_2CHBr)(CH_3)SiO]_4$$
$$[(ICH_2CHBr)(CH_3)SiO]_4$$

and $$[(BrCH_2CHI)(CH_3)SiO]_4$$

4. The composition of claim 3 in which said oil of lubricating viscosity is a hydrocarbon oil.

References Cited
UNITED STATES PATENTS

| | | | |
|---|---|---|---|
| 2,715,113 | 8/1955 | Gordon | 252—49.6 X |
| 2,800,494 | 7/1957 | Haluska | 252—49.6 X |
| 2,989,560 | 6/1961 | Marsden | 252—49.6 X |
| 3,479,290 | 11/1969 | Brown | 252—49.6 X |

DANIEL E. WYMAN, Primary Examiner

W. H. CANNON, Assistant Examiner